Jan. 12, 1971     D. W. ROLLINS     3,554,609
PNEUMATIC OUTLET FOR A HOPPER
Filed Aug. 26, 1968     7 Sheets-Sheet 1

INVENTOR.
DALLAS W. ROLLINS
BY *Samuel J. Snyder*
ATTORNEY

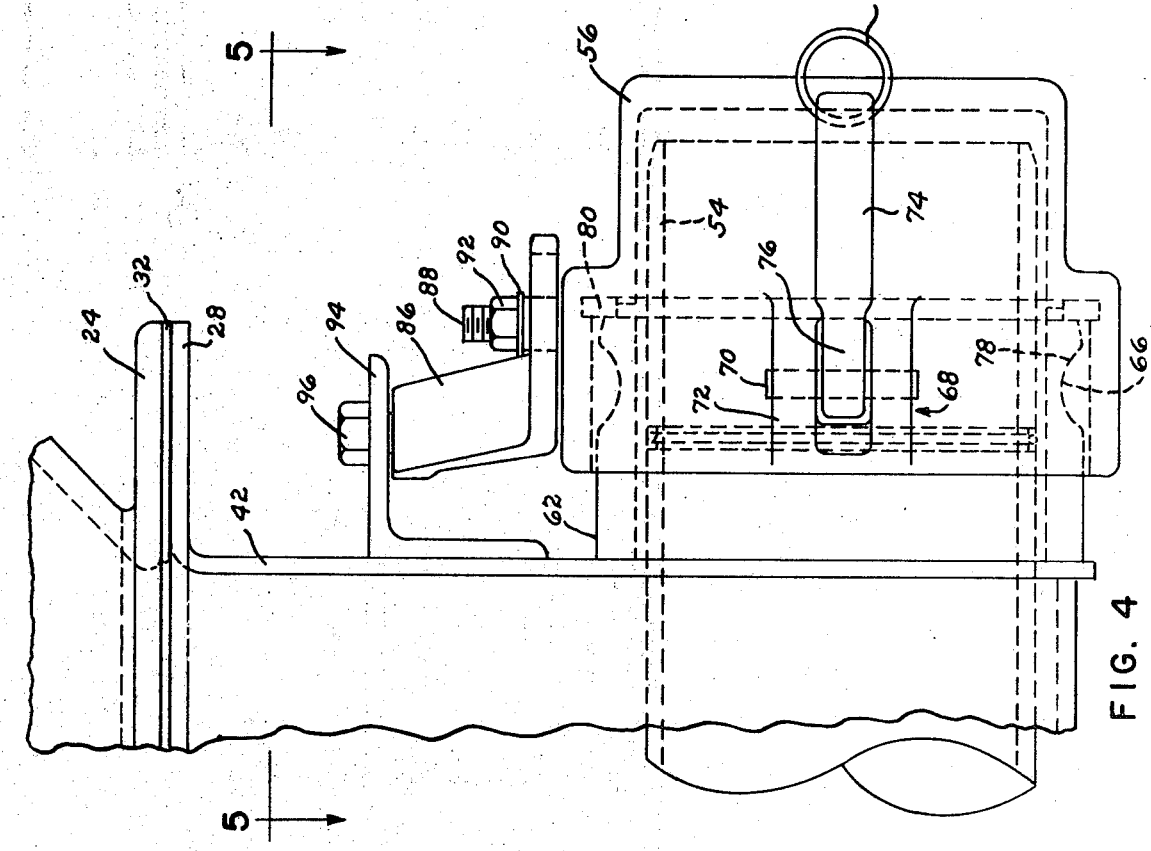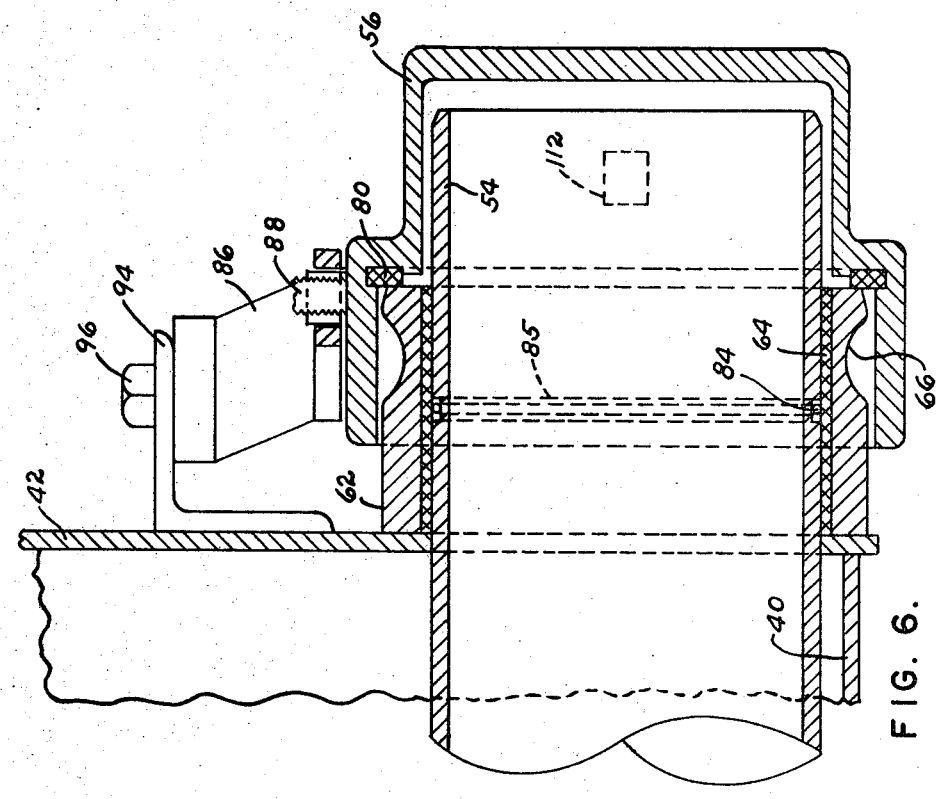

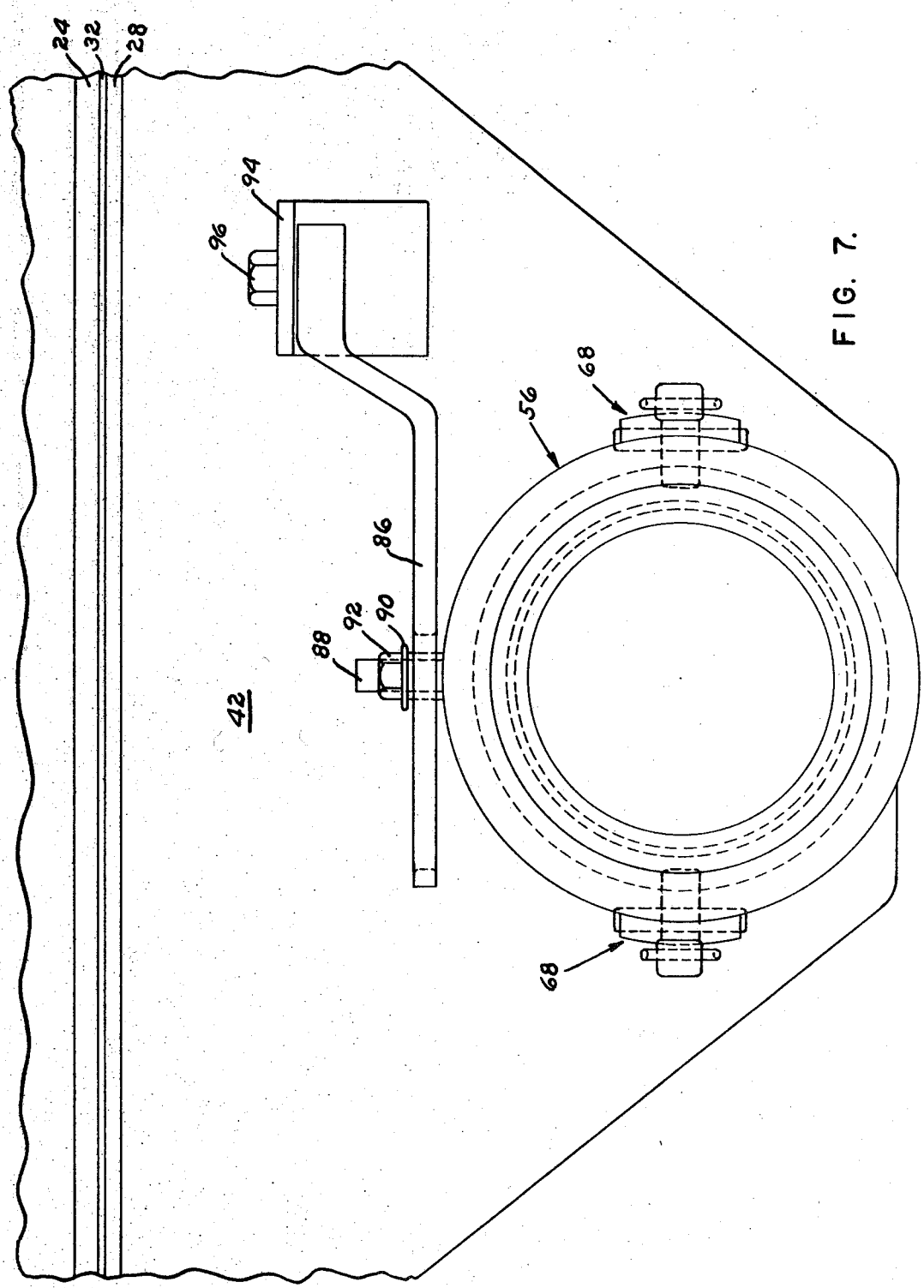

United States Patent Office 3,554,609
Patented Jan. 12, 1971

3,554,609
PNEUMATIC OUTLET FOR A HOPPER
Dallas W. Rollins, St. Charles, Mo., assignor to ACF Industries, Incorporated, New York, N.Y., a corporation of New Jersey
Filed Aug. 26, 1968, Ser. No. 755,091
Int. Cl. B65g 53/40
U.S. Cl. 302—52                                   4 Claims

ABSTRACT OF THE DISCLOSURE

The outlet of a hopper has a rotary valve tube provided with an adaptor at each end of the hopper. The adaptor has a bushing in which the valve tube rotates, and each adaptor has an external groove in which an end closure cap may be locked. The rotary tube has grooves in which the coupler of a material discharge hose may be locked. Seals are provided to prevent air leakage when either the end cap or the discharge tube is connected. The coupler has handles for rotating the tube to open or close the valve.

BACKGROUND OF THE INVENTION

Railroad hopper cars for carrying granular or pulverant materials may have pneumatic outlets for discharging the material by an air stream. At the bottom of each hopper there is a valve in the form of a tube rotatable on its axis and having openings on one side thereof, so that the material flows into the tube when its open side is upward. The flow of material may be facilitated by fluidizing it adjacent the valve, as shown in Pat. No. 3,246,805. The rotatable tube extends across the width of the car and has openings at both sides which are normally closed by end caps. Hopper outlets of this type have been found to be subject to air leakage. The leaks are due to gradual relieving of weld stresses, which distort the shape of the sealing surfaces, and denting and distortion of the seal rings in service, and foreign matter in the caps and seal rings. The object of the invention is to overcome most of these problems by eliminating the previously used rotating seals and using a cam tightened end fitting for the only in-transit seal.

SUMMARY OF THE INVENTION

The rotary valve tube of a hopper is mounted at both ends in adaptors welded to the hopper. Each adaptor has a sleeve bearing for the valve tube formed of Teflon, fiberglass and molybdenum disulphide and cemented in the adaptor. The adaptor has a groove for a "Kamlok" connector for the end cap. The rotary tube also has a groove for a "Kamlok" connector for the coupler of a material discharge hose. Both the end cap and the coupler have sealing rings, which engage the end of the adaptor or the end of the valve tube, respectively, and are tightened by the "Kamlok" connectors.

BRIEF DESCRIPTION OF THE DRAWING

The drawing consists of the following figures:
FIG. 4 is a side view showing an end cap at one side of the outlet.
FIG. 6 is a sectional view taken along the line of 6—6 of FIG. 5.
FIG. 7 is an end view of the hopper outlet with the end cap thereon.

DESCRIPTION OF THE PREFERRED EMBODIMENT

Figure 1:
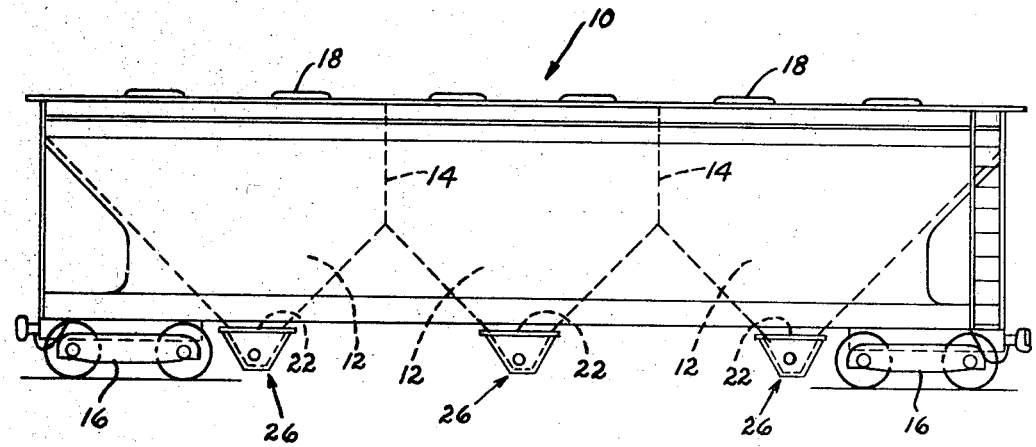
FIG. 1 is an elevation of a covered hopper railway car adapted to be unloaded pneumatically from an outlet structure secured to the bottom of each hopper structure.

Referring to FIG. 1 of the drawings, a covered railway hopper car is generally designated 10 and has a plurality of hopper structures 12 separated by partitions or bulkheads 14. A truck assembly 16 is arranged at each end of car 10. Spaced along the top of car 10 are hatch covers 18 for loading of the car with pulverulent, granular, crushed or finely-divided materials. Hopper sheets of each hopper structure 12 slope downwardly to a bottom opening 22. A peripheral outer flange 24 extends about each opening 22.

Figure 2:
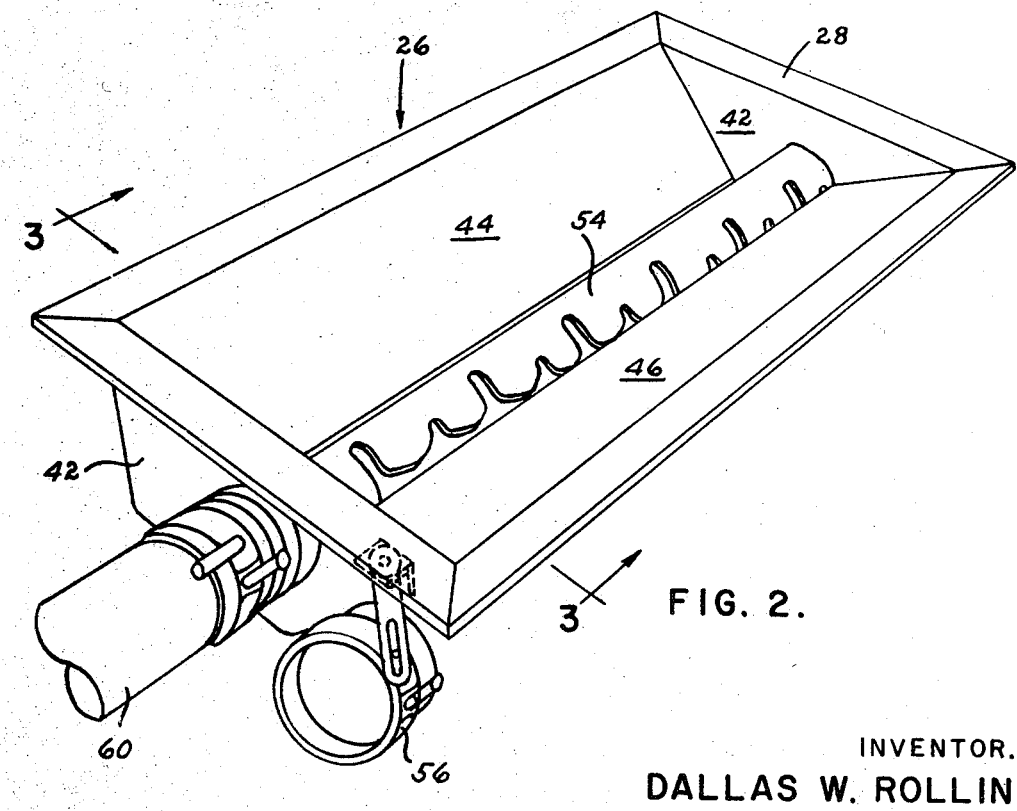
FIG. 2 is a perspective of one of the outlet structures of FIG. 1 removed from the hopper car and illustrating the metering valve in one position.

Mounted beneath each hopper structure 12 is an outlet structure generally designated 26 for pneumatically unloading material from car 10. As shown in FIG. 2, each outlet structure 26 has a generally rectangular upper outer peripheral flange 28 adapted to fit against flange 24. Flange 28 may be secured, such as by suitable nut and bolt combinations. A suitable gasket 32 may be positioned between flanges 24 and 28, if desired.

Outlet structure 26 includes an outer housing 34 having oppositely facing sloping side walls 36 and 38 integrally conected by a generally horizontal bottom 40. Housing 34 may be secured, such as by welding, along flange 28. End walls 42 extend vertically between side walls 36 and 38 to form a trough-shaped outlet structure 26.

Figure 3:
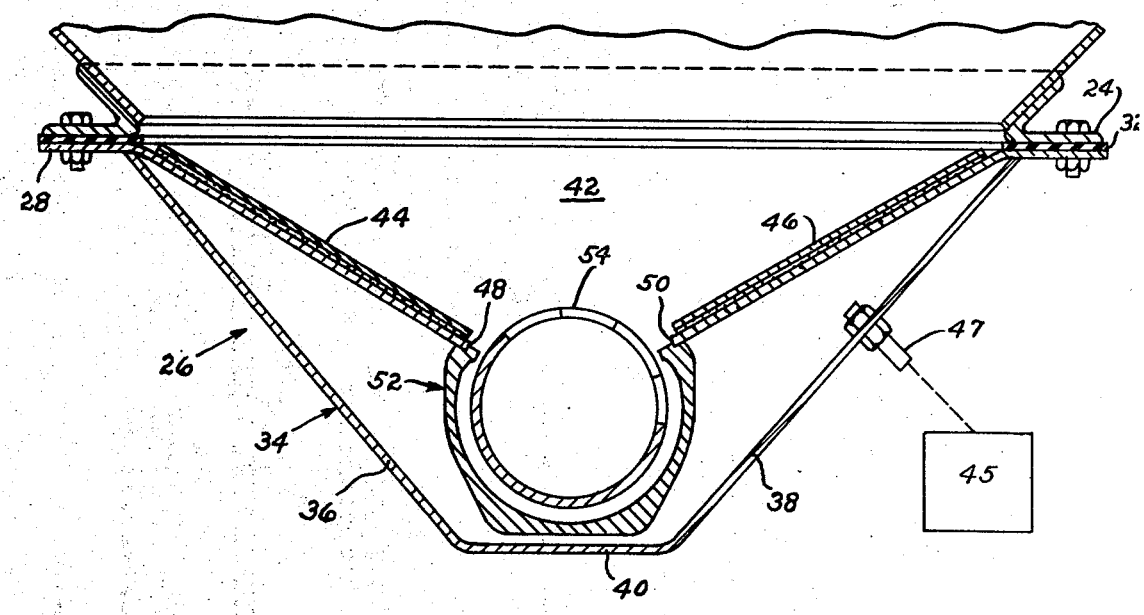
FIG. 3 is a transverse section of the outlet structure of FIG. 2 taken generally along line 3—3 of FIG. 2.
Figure 5:
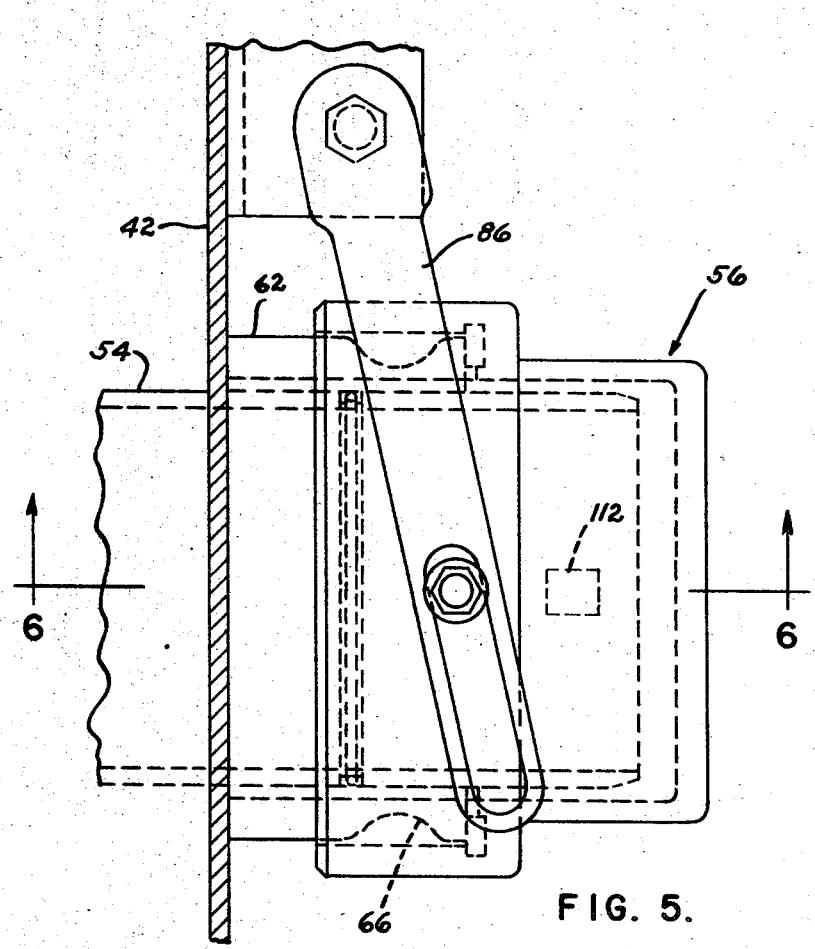
FIG. 5 is a sectional view taken along the line of 5—5 of FIG. 4 showing the end cap in plan view.
Figure 8:
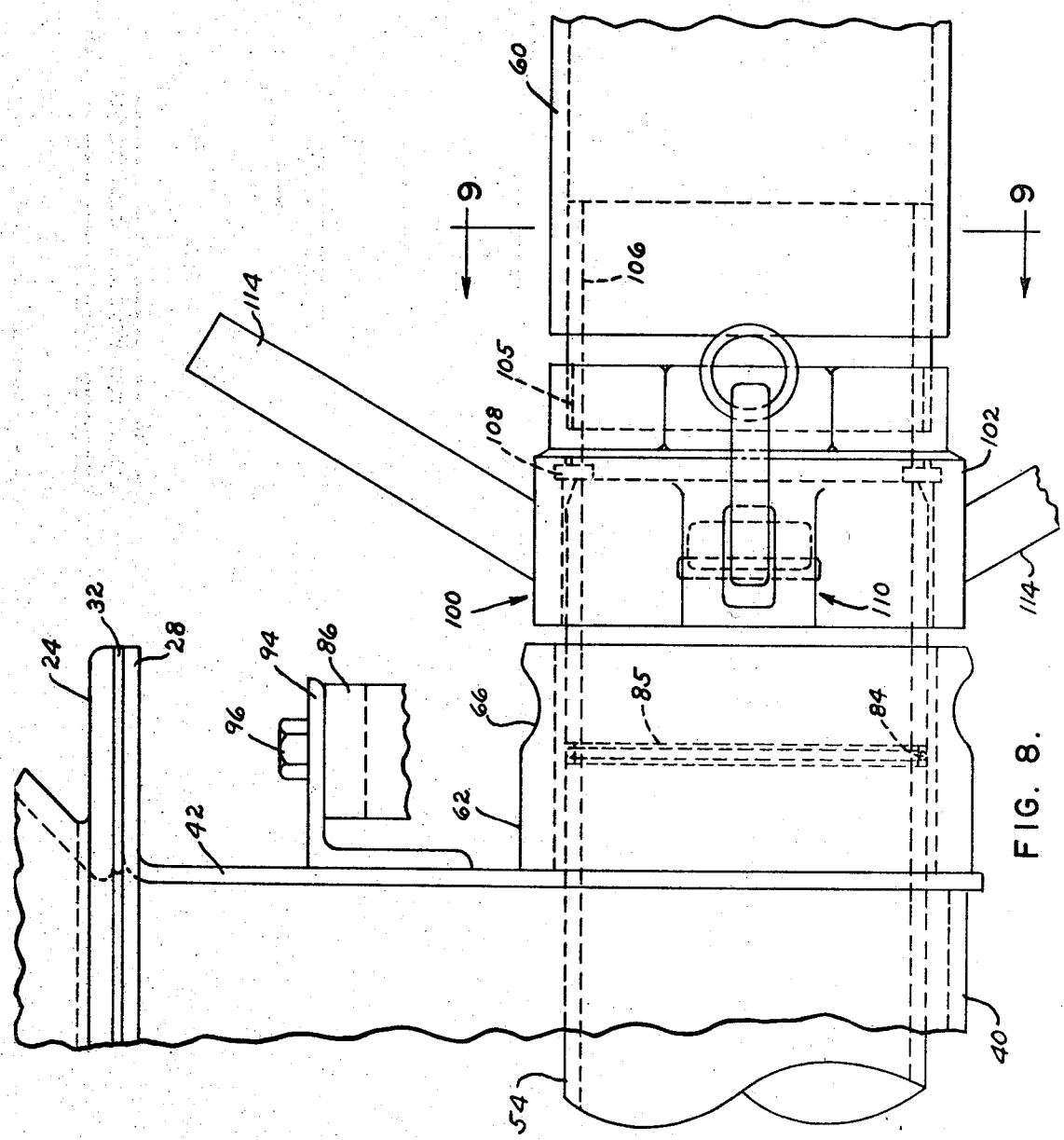
FIG. 8 is a side view of the hopper outlet with the discharge hose attached thereto.

Within outer housing 34 are inner side walls 44 and 46 inclined downwardly and having spaced respective marginal portions 48 and 50 at their lower ends. Extending between and connecting marginal portions 48 and 50 at their lower end as shown in FIG. 3 is a generally U-shaped housing generally designated 52 forming a channel or furrowed bottom for outlet structure 26.

Material to be discharged moves downwardly along inner side walls 44 and 46, which may be formed of permeable material. Air under pressure is supplied from a source 45 through a conduit 47. The air passes through walls 44, 46 to fluidize the material in the hopper to facilitate its flow into tube 54. To discharge the material pneumatically, a metering valve or tube generally designated 54 fits within U-shaped housing 52 between lower marginal portions 48 and 50. Tube 54 has a slot arrangement permitting material to flow within the tube and to be removed pneumatically. An end cap 56 is positioned over each end of tube 54 as shown in FIG. 6 and material may be unloaded from either end of tube 54. End caps 56 are normally removed when the material is unloaded, one end of tube 54 being connected to a suitable suction hose 60 for conveying the material to a suitable storage facility, and the other opposite end drawing air in tube 54.

At both sides of each hopper adaptors 62 are welded around their entire periphery to sides 42 of the hoppers concentrically with tube 54. Each adaptor 62 has a bushing 64 cemented therein formed of 80% "Teflon", 15% fiberglass, and 5% molybdenum disulphide, and forming a sleeve bearing for tube 54. Circular groove 66 receives cam locking means 68 for locking end cap 56 on adaptor 62. The locking means may be of the type sold under the name "Kamlok," made by the OPW Company of Cincinnati, Ohio. Locking means 68 includes pin 70 in U-shaped lug 72 and an arm 74 pivotally connected to pin 70 and a camming member 76 around pin 70. When arms 74 are turned against the sides of end cap 56, cam member 76 enters groove 66 of adaptor 62 and cams against the portion 78 of groove 66, pulling cap 56 tightly against adaptor 62, thereby causing a flexible sealing ring 80 in cap 56 to be tightly clamped against adaptor 62. Although not shown, it is apparent that the rings 82 of a pair of locks may be strapped together to secure them against unwanted opening. An additional air sealing ring 84 in a groove 85 may be provided between tube 54 and bearing 64.

Figure 9:
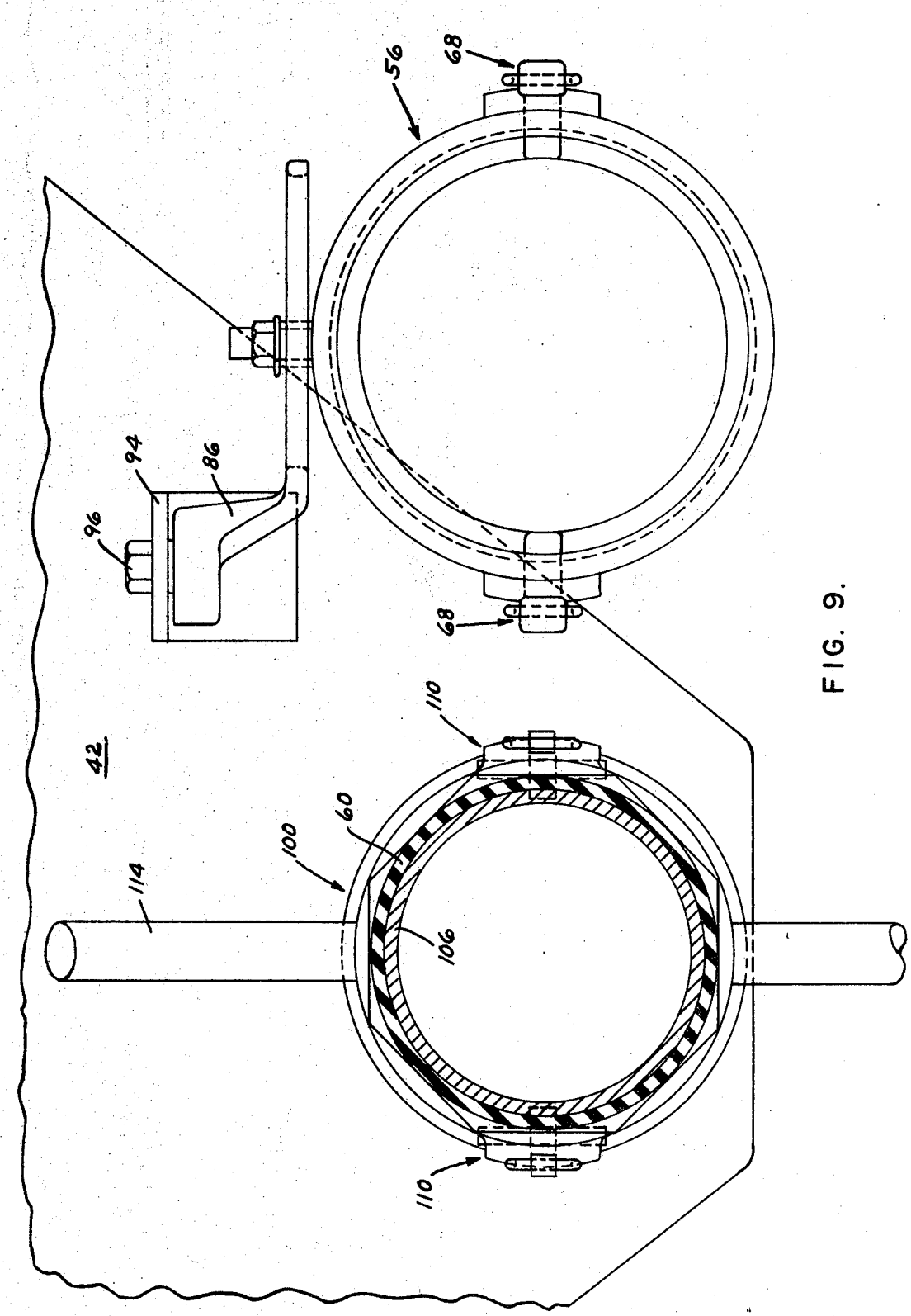
FIG. 9 is a sectional view taken along the line 9—9 of FIG. 8 with the end cap swung back.
Figure 11:
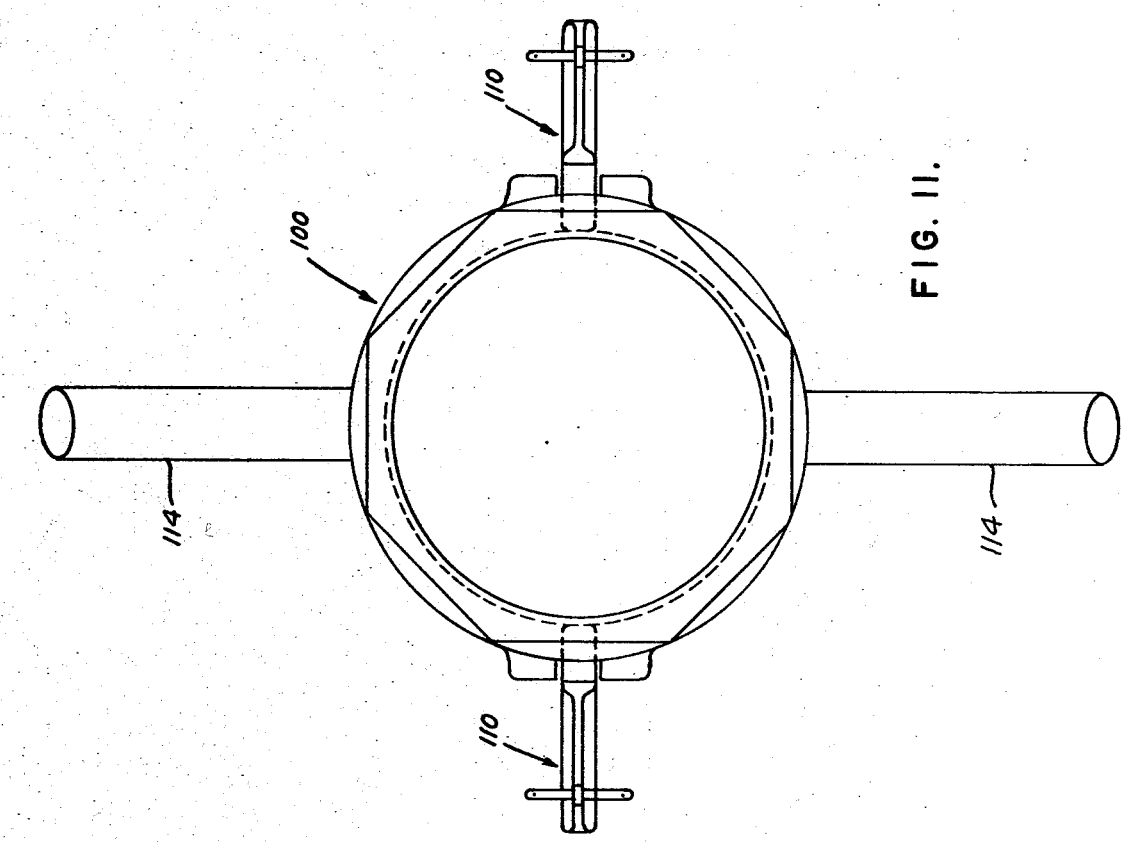
FIG. 11 is an end view of the hose coupler.
Figure 10:
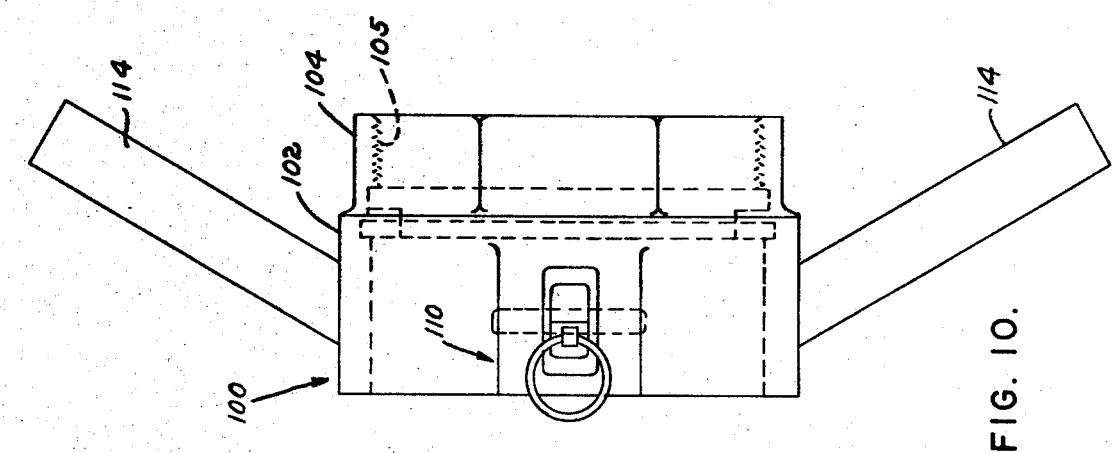
FIG. 10 is a top plan view of the hose coupler.

End cap 56 is supported by a slotted arm 86 by means of a stud 88 fixed to end cap 56, and a washer 90 and nut 92. The other end of arm 86 is pivoted on bracket 94 by screw 96, bracket 94 being welded to wall 42 of the hopper. The end cap 56 can be swung onto adaptor 62, or retracted to the positions shown in FIGS. 2 and 9.

Referring to FIGS. 8 to 11, hose 60 is adapted to be connected to tube 54 by coupler 100. The coupler includes a fitting 102 having a nut 104 threaded at 105 on a pipe sleeve 106 fixed in the end of hose 60. Sealing ring 108, which may be of compressible material, is fixed in fitting 102 and is adapted to abut the end of tube 54. A pair of locking devices 110, of the same type as locking means 68, cooperate with a pair of grooves 112 in tube 54. Locking devices 110 lock coupler 100 to tube 54 and cam it toward tube 54 to squeeze sealing ring 108 tightly against the end of tube 54. Handles 114 are provided for turning coupler 100 and tube 54 to its open position and permit the hopper to discharge thereinto. Hose 60 extends to any desired receptacle for the material being unloaded and is adapted to be connected to suitable air suction means. During unloading the end cap is removed on the side of tube 54 opposite to the side to which hose 60 is connected, so that a stream of air passes through tube 54 into hose 60, carrying away the material falling into tube 54 from the hopper.

The operation of the apparatus herein disclosed is apparent from the description thereof. In transit end cap 56 is securely held closed by locking means 68, and by tightening nut 92 to fix the end cap to its supporting arm 86. Seal 80 prevents air leakage in transit, and further sealing against leakage is provided by seal ring 84. During unloading air leakage is effectively prevented by sealing ring 108.

I claim:

1. An outlet structure for a hopper of a closed hopper railway car comprising a rotary valve including a rotary tube extending transversely across the bottom of the hopper, a pair of cylindrical adaptors coaxial with said rotary tube and fixedly mounted in air tight relation on opposite lateral walls of the hopper and extending outwardly from said walls, a continuous ring bearing for said rotary tube fixed in each adaptor and forming an airtight seal with each adaptor, said tube being journalled in and extending through said bearings, an end closure cap adapted to fit over each adaptor and having a flexible sealing ring therein positioned to engage a surface of the adaptor, and means for fastening each end cap to its adaptor with said flexible sealing ring tightly clamped therebetween to provide airtight closures for said tube.

2. An outlet structure according to claim 1, including a discharge hose having a coupler, means on said coupler for fastening it to either end of said tube when the end cap is not thereon, a flexible sealing ring in said coupler adapted to be clamped between said coupler and said tube when said coupler and tube are fastened together, and means on said coupler for rotating said coupler and tube for opening and closing said valve.

3. An outlet structure according to claim 1, wherein said bearings are sleeve bearings bonded to the adaptors.

4. An outlet structure for a hopper of a railway hopper car comprising a valve including a tube rotatable about its axis and having an opening along at least one side thereof for admitting material from the hopper into said tube when the open side is turned upward, said tube extending across and beyond the bottom of the hopper and adapted to close the bottom thereof, a bearing in the form of a closed ring bushing for each end of said tube, means for mounting said bearings on opposite side walls of said hopper in airtight relation to said side walls and said tube, an end closure cap adapted to fit over each end of said tube and having a sealing ring therein positioned to engage a surface on one of said means for mounting the bearings, and means for fastening each end cap to said bearing mounting means with said sealing ring clamped therebetween.

References Cited

UNITED STATES PATENTS

| 3,136,584 | 6/1964 | Whitlock | 302—52 |
| 3,158,406 | 11/1964 | Aller | 302—52 |
| 3,350,141 | 10/1967 | McGrath | 302—52 |
| 3,403,943 | 10/1968 | Stine et al. | 302—52 |
| 3,408,117 | 10/1968 | Koranda | 302—52 |

ANDRES H. NIELSEN, Primary Examiner

U.S. Cl. X.R.

302—17